(12) United States Patent
Rao

(10) Patent No.: US 10,181,152 B1
(45) Date of Patent: Jan. 15, 2019

(54) DRONE BASED PACKAGE DELIVERY SYSTEM

(71) Applicant: Sanjay K. Rao, Palo Alto, CA (US)

(72) Inventor: Sanjay K. Rao, Palo Alto, CA (US)

(*) Notice: Subject to any disclaimer, the term of this patent is extended or adjusted under 35 U.S.C. 154(b) by 0 days.

(21) Appl. No.: 15/693,850

(22) Filed: Sep. 1, 2017

Related U.S. Application Data

(60) Provisional application No. 62/383,308, filed on Sep. 2, 2016.

(51) Int. Cl.
*G06Q 30/06* (2012.01)
*G06Q 10/08* (2012.01)
*G06F 17/30* (2006.01)
*G06Q 20/20* (2012.01)

(52) U.S. Cl.
CPC ... *G06Q 30/0645* (2013.01); *G06F 17/30979* (2013.01); *G06Q 10/08* (2013.01); *G06Q 10/083* (2013.01); *G06Q 10/087* (2013.01); *G06Q 10/0875* (2013.01); *G06Q 20/203* (2013.01)

(58) Field of Classification Search
CPC .. G06K 7/10366; G06Q 10/087; G06Q 10/08; G06Q 10/0875; G06Q 30/018; G06Q 30/0645

USPC .......................................................... 705/28
See application file for complete search history.

(56) References Cited

U.S. PATENT DOCUMENTS

| | | | | |
|---|---|---|---|---|
| 2016/0189098 | A1* | 6/2016 | Beaurepaire | G06Q 10/0835 705/337 |
| 2016/0316322 | A1* | 10/2016 | Gillen | H04W 4/02 |
| 2017/0139409 | A1* | 5/2017 | Clarke | G05D 1/0011 |

OTHER PUBLICATIONS

Tech Focus: A Sunrise Peppered With Drones. Electronics for You; New Delhi; Feb. 1, 2016.*

* cited by examiner

*Primary Examiner* — Florian M Zeender
*Assistant Examiner* — Fawaad Haider

(57) ABSTRACT

A computing device is enabled to be networked into a delivery and authentication system. The user may geo-fence their property further marking points of interest with a drop down marker being displayed on a mobile device and on a map. POIs may be established for drone delivery systems. Large drones may be enabled with an open area to allow for smaller drones to fit into the large drone. The large drone may include in a loading bay the various other smaller drones. Upon reaching a specific destination the large drone may be enabled to open a transport bay and release the smaller drones for last mile delivery.

14 Claims, 9 Drawing Sheets

Property Zone Configuration

Visualization Tool of Property and Drone Flight Paths on Mobile

Dynamic Pricing Based on Altitude, Noise, Speed And Factors

Authentication Factors and Delivery Components

- Delivery compartment
- Facial authentication
- Person authentication

DRONE BASED PACKAGE DELIVERY SYSTEM

This application claims priority to U.S. Provisional Patent Application No. 62/383,308 filed on Sep. 2, 2016; this application incorporates by reference in its entirety the afore mentioned provisional application.

BACKGROUND

This disclosure relates to online systems that enable homeowners and businesses to monetize their property and proximate property through supplementary mechanisms. While home owners may be enabled to rent out rooms, partial rooms, and other spaces within their property, there does not exist methods for homeowners to rent out supplemental non-room based assets.

Meanwhile there are not efficient routing mechanisms by which drones and aerial vehicles can fly via unregulated airspace. This disclosure relates to systems that enable efficient routing of drones and UAV devices over specified mapping paths and further enable property owners aerial monetization options. The FAA and other administrations has allowed for commercial and recreational use of drones especially under certain altitudes and with line of sight thereby creating a openness for drone usage. This is likely to lead to a large number of drone devices flying in aerial zones that are not managed by any authority. This disclosure further relates to systems that relate to coordination of drone activity especially as it pertains unregulated localized routes and further in conjunction with individuals monetization programs of areas within their aerial zones of property management.

SUMMARY

This disclosure relates to mapping delivery systems and drones and unmanned aerial vehicles (UAV).

In various aspects this disclosure applies to various aerial and terrain based devices. In some instances, these devices may be drones such as bi-copters or quadcopters, larger delivery devices, manned aerial devices, flying cars, hybrid car and flying machines, manned aerial devices, or other transportation devices. In various instances the term UAV is referred as an illustrative embodiment; it should be understood however that other transportation devices including those afore mentioned shall further also be intended as alternatives.

The use of commercial, private, recreational, security, delivery and other types of drones continues to expand. As such expansion occurs, various routes and flying patterns associated with said devices increasingly may involve paths over various people's houses, businesses, and private residences. As an example, a delivery path for a drone delivery system may involve traveling over the neighbor's residence to deliver it the recipient. This repeated flying of can lead to distraction and frustration from various intermediaries. This unregulated space may lead to overuse by certain delivery companies.

The disclosure enables homeowners and businesses the ability to monetize the aerial space above their homes for delivery systems and other transport modes. This rental of airspace is presently not enabled by systems. This disclosure allows for a rental model of the airspace including that which is highly proximate to a property owner. Providing a platform to allow for this airspace rental or at a minimum reporting is likely to enable greater cooperation between land owners and drone operators.

In various instances is it is an aspect of the platform to enable for a mapping system between a user's place of residence and the ability of items to be in close proximity to the location of the user.

In one or more embodiments, a user is enabled to sign up for a service that provides the user with the ability to set a bid price for activities that occur in proximity to the users residence on a basis of the altitude, type of transportation device, sound factor emitted.

A delivery drone or transportation drone may be associated with one or more transportation properties that can have parameters including: decibel level of sound emitted by drone, size of drone, visual appeal, speed, altitude, safety indications, and return path.

These parameters may be broadcast via an XML or other markup. They may be broadcast locally via a Bluetooth, wifi, wifi-local, LTE, LTE advanced, cellular, GPRS, 3G, 4G, 2G, or other wireless or wired communication system.

A network cloud based platform may be enabled to provide efficient routing of packages and delivery items for drones. The cloud system may include a decision engine that includes various paths of how packages may be delivered over residential areas. As an example, a server or set of servers may govern how to direct the flight plans of the various delivery drones.

In one instance, a user may set a price per flight, per time, per activity, or per vendor for a UAV to fly over their residence. For example, a drone that is delivering a small package may have a lower decibel level and may need to fly lower to an individuals house if the next delivery location is close to that user's house.

In other embodiments, the package routing system may be enabled to identify the type of drop off available in the vicinity. As an example a business may specify that it is a drop off point for packages and a forward point for other local terrestrial vehicles and trucks or local delivery people to complete the drop off. These spots may the specify a certain price for the services based on a per package per transport hourly, or other indicator. A self-driving truck or transport vehicle may then complete the last mile of service in certain cases. In other instances, the opposite may be enabled wherein a self-driving car or truck may deliver a package to a house or business which has signed on for a supplementary drone delivery service. In this instance, the rooftop or parking lot of this business may be enabled to provide delivery landing areas for drones to further delivery. In various instances, the hours of operations may further be set between the various transportation devices.

Each location may broadcast various attributes associated with a package and delivery routing system. As an example a business may broadcast that drones may use its rooftop for coordinate delivery after traditional working hours. In other instances, a business may be a coordination point for various other drones from larger drones to smaller drones.

While traditional approaches of large distribution centers may be appropriate for terrestrial package delivery systems, this disclosure enables a plurality of distributed staging and delivery zones to be created. It is anticipated that a specific distribution center, home, or office may be set up for drone delivery of a first package A. These staging areas may take place in office parks for example or other distributed networked areas. In other instances, the package A may be combined with a package B at a second location. These packages may be grouped together for a neighborhood level drone or a specific house drone. In these instances packages may be grouped together and placed from a first drone into a second drone. These drones may self-coordinate with each other to deliver the various packages.

Large drones may be enabled with an open area to allow for smaller drones to fit into the large drone. The large drone may include in a loading bay the various other smaller drones. Upon reaching a specific destination the large drone may be enabled to open a transport bay and release the smaller drones for last mile delivery. This approach may save significant time and resources as the larger drone does not need to visit all of the specific sites for delivery. Meanwhile efficiency may be obtained via the delivery over long-haul transport.

Drones themselves may be coordinated for delivery in a real-time fashion. As orders stream in, the various ecommerce orders my have associated with them a time to server or a priority level indication. In these instances, the priority indication may result in a specific path being taken over one path and another.

Various reservation systems including booking, searching, reserving, paying, and auditing may be implemented in the server. An availability module may show flight paths or areas for a drone to park, charge, or travel. A community of individuals may sign up for the service so as to allow individuals to book and rent out parts of the property for landing, charging, or flight paths of drones across their land.

BRIEF DESCRIPTION OF SEVERAL VIEWS OF THE DRAWING

The accompanying drawings, being incorporated in and forming a part of this specification, illustrate embodiments of the disclosure and, together with the description, serve to explain the principles of the present disclosure.

DETAILED DESCRIPTION

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to those embodiments. On the contrary, the disclosure is intended to cover alternatives, modifications and equivalents, which may be included within the spirit and scope of the disclosure as defined by the appended claims.

Figure 1:
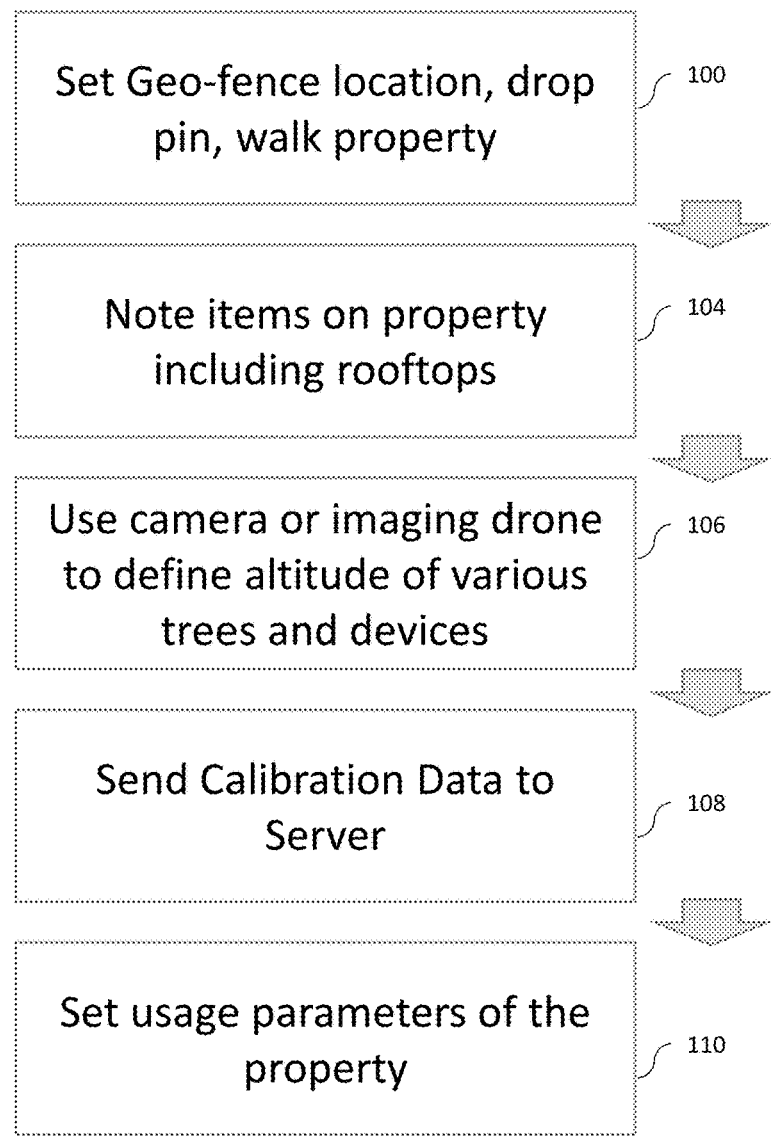
FIG. 1 depicts a property zone configuration system including a geofence system.

Referring now to FIG. 1, FIG. 1 depicts an auction system in which individuals may specify a bid price for a drone to travel over the house or ownership zone. The bid ask system may include a time of the data, a flight pattern, an altitude, a vector and other data. The user may be enabled to provide a configuration profile with the flightplan server using a variety of steps. A user may be enabled to walk a property 100 and geofence the area using a mobile device or other drone. The user is enabled to notate on their property profile various terrain or other obstacles or notations 104. This may be done via uploading to the server images which can be recognized or by taking a video of their property which can be analyzed to identify various objects. A surveyor drone is enabled to image the property and survey various terrain items 106. The calibration data is further enabled to be sent to a server 108 and stored and associated with the user in the profile. The user is enabled to set micro-flight plans across their property so as to avoid certain areas and request flight paths in other areas. As an example, a user is enabled to draw on a aerial picture of their property various ways that a drone may flight such as following close to the curb, moving through a backyard avoiding a house, avoiding certain windows and so forth. This can be done using marks on a property view.

Figure 2:
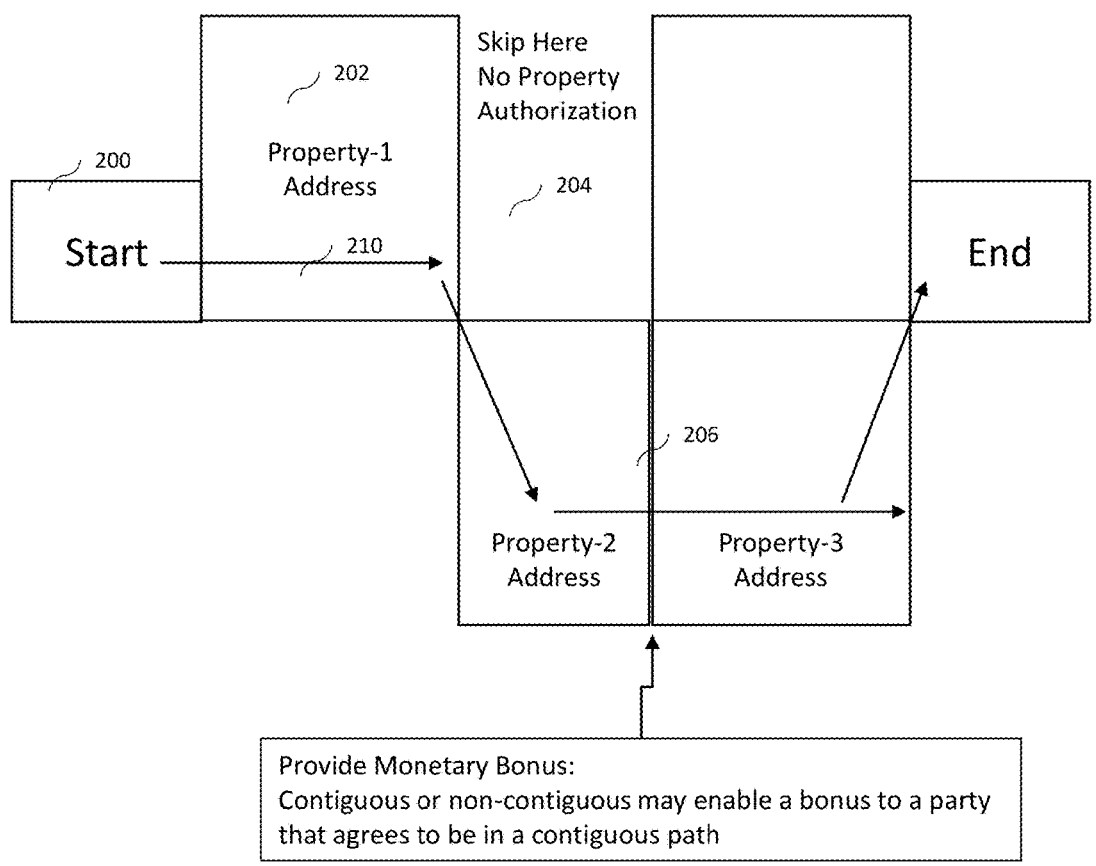
FIG. 2 depicts a an aerial path map that involves a drone path across multiple properties and skipping other properties.

Referring now to FIG. 2, FIG. 2 depicts various criteria that may be used to determine whether a drone may pass over a person's house. A path may be created for the user to travel over a particular area. A user may geofence their property via mobile application that can be used to walk the border of a property or a key area of the property. Alternatively, mapping data may be established from municipalities, public databases, housing databases, or online resources. In these instances, a user may then set rules associated with the types of transportation devices that may fly over their area. These rules may fall lower than where the FAA or other federal agencies govern rules of flight. A drag and drop or mobile application may be enabled to allow for the configuration of this personal aerial zones.

Once this path is created a flight plan for a drone may be enabled as indicated by the arrows. The flight plan may take the drone over specific routes within the property and to contiguous properties. In certain instances, property flight paths 210 may not include contiguous properties such as that in those instances a marketplace may give a bonus to a property owner to provide access to their aerial zones.

It is an aspect of the present disclosure to enable reviews to be set for various vendors. In various instances, the transportation networks may be enabled via a coordinated set of network paths from a variety of households and property owners opting in to the system. It is an aspect of the disclosure to enable application programming interfaces (APIs) to interface between one transportation system to another.

In another aspect of the drone delivery system it is anticipated that shortest path between two aerial locations may not be appropriate. The towers in between various sites such as office towers may provide distractions. Meanwhile, a virtual renting of floors above the building may be created such that drones may pass via levels in the air. Each drone may be identified with a position in this virtual tower. Owners may configure virtual towers on the platform and classify various devices in those zones.

Figure 3:
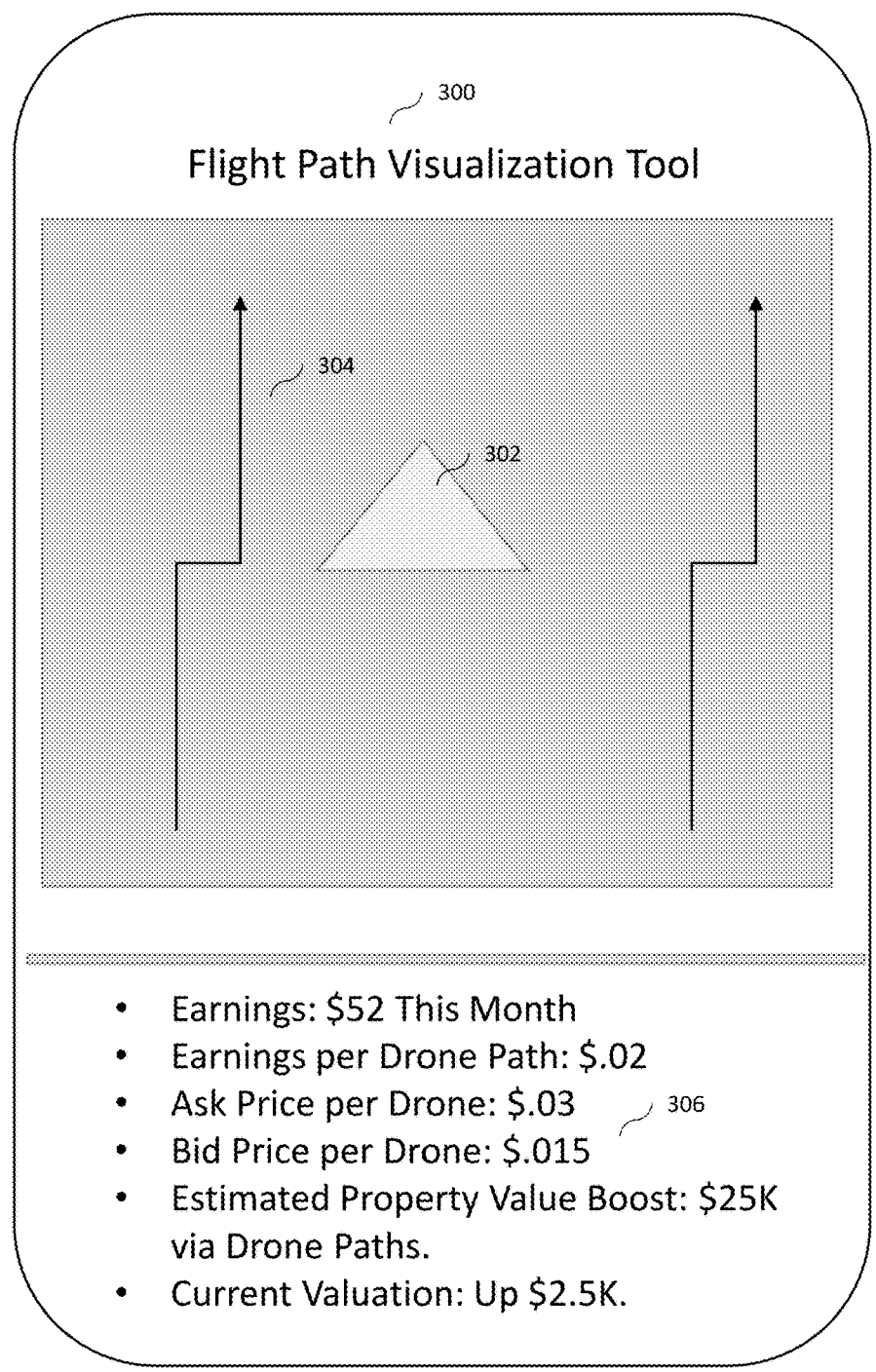
FIG. 3 depicts a mobile application that visualizes various flight paths along with the monetization rates.

Referring now to FIG. 3, FIG. 3 depicts various visualization and user interface components both for a property owner and a drone operator. As an example, a visualization tool for owners to see those devices that are travelling overhead and to file complaints with the vendor should the owner find issue with certain aspects. In this system the platform may be enabled to accept feedback comments and ratings regarding various transportation entities and send such information back to the vendors.

That is a search engine may further be created for network aerial paths. Automated queries may further be defined. In these instances, the search engine may take as input various households and owners prices and acceptability of the various drones to travel over the airspace of the home owners. As a single homeowners acceptability would prove to limit the options available to the users, it is necessary to have multiple owners business districts and so forth opt-in. As an example a search engine for delivery routes may search the marketplace to determine the various locations between different points that are approved on a zone map.

FIG. 3 depicts a mobile application 300 which includes the property of the owner including the location, latitude and longitude and recent flight paths of drones on the property 302. Monetization information associated with the flight paths 304 is also shown including the user's current ask price and the market bid price for a flight over the person's property 306. It is expected that certain locations may ultimately have a higher real-estate value if their property includes a highly desired traffic route. In other instances, a location may have a lower value if it is proximate to various drone delivery staging areas or is not in a desirable drone delivery zone.

A housing service or other valuation service may also include a property value estimate based on the drone monetization of the property. This monetization and valuation module may use various data sources including the value of other add-ons such as solar panels or based on the historical drone flight path volume and the price paid per flight path and the anticipated drone volume based on demand and the offering by neighbors.

The mobile application may be stored in a non transitory computer readable medium and built using various software programming instructions for execution by a processor on a cloud and/or mobile device. The visualization tool may also be accessible on a web or other interface. A wearable device may further be used for geofencing of the areas.

Figure 4:
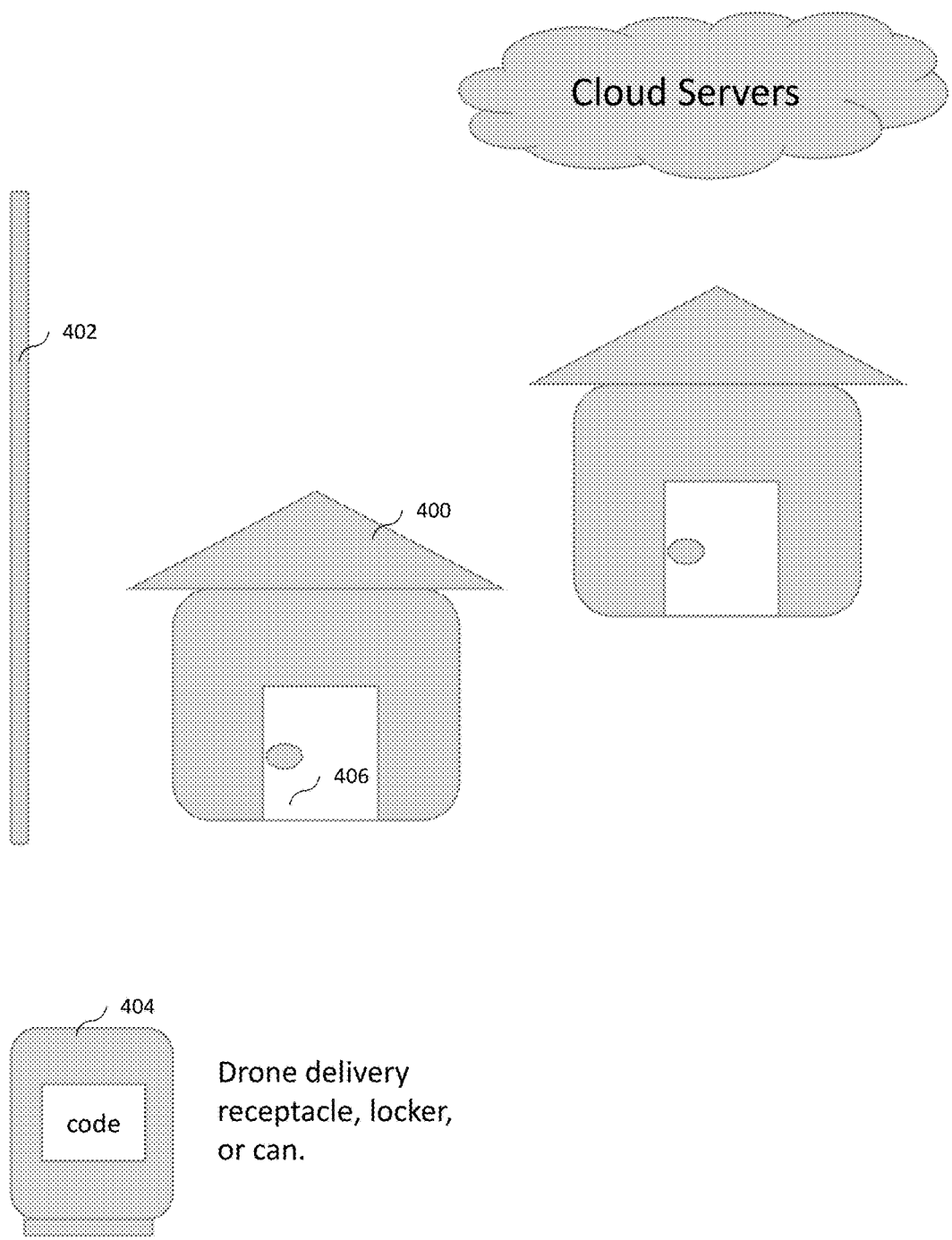
FIG. 4 depicts various drone pick-up and drop-off zones on a house.

Referring now to FIG. 4, FIG. 4 depicts various devices that may be used to allow for drone delivery systems to deliver products at certain places on the house 400. In one embodiment, the drone delivery system may include a pole device 402 with horizontal lines on either side. This pole may be installed on the roof of the house or in various places on the property of the user. A calibration method is enabled via the platform described herein that allows users to calibrate delivery zones and transit zones within their property. As an example a mobile application may be implemented to be run as an application executed by a processor on a mobile device or a wearable device. The user may be enabled to walk the property and geo-fence their property further marking points of interest with a drop down marker being displayed on a mobile device and on a map. POIs may be established for drone delivery systems. For example, a trash can, can or receptacle 404 may be identified for drone delivery systems to throw products away. A mailbox may be identified as a POI for drone delivery of small packages. A front door may be assigned a POI for delivery of a package by the front door 406.

Figure 5:
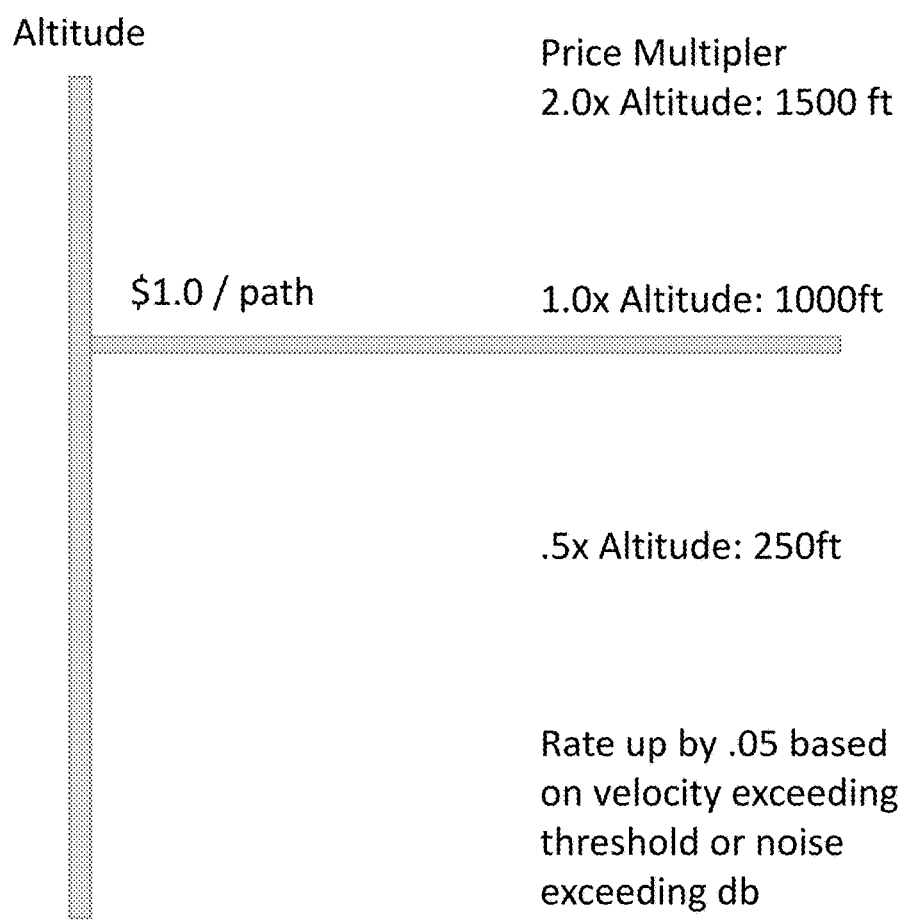
FIG. 5 depicts a pricing module for altitudes and noise and other factors for drones.

Referring now to FIG. 5, FIG. 5 depicts various payment rates associated with different altitudes above a person's house. As an example, 50 feet above a person's house may be priced at 1.5× the normalized rate whereas 150 feet above a house may be at just 0.5× the rate of that at 100 feet above a house. The rates may be dynamically set by the individual or by an exchange. As an example, a drone within just 50 ft above a rooftop may be easily seen or heard whereas that several hundred feet above may not be. These may be priced further at different times of the day or night. An exchange may further take the parameters of the individual's ownership and those of altitude and personal prices to define set the altitude routes of the drones.

It is an aspect of the present disclosure to enable the drones to provide internet connectivity or image recognition and capture at various altitudes. These capabilities of the drones may further be set via the marketplace such that certain drones are configured to operate as audit drones or coordination drones.

Figure 6:
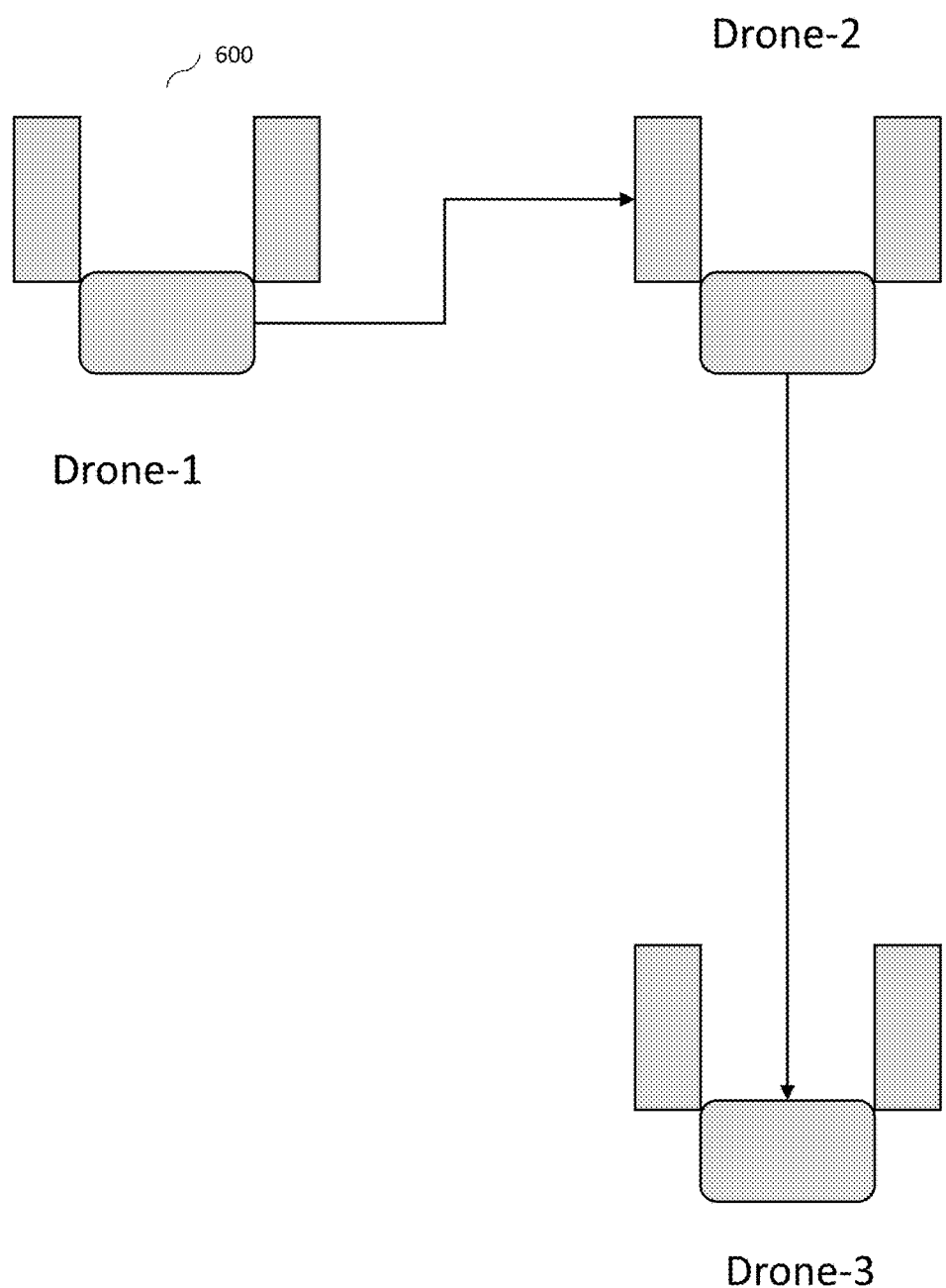
FIG. 6 depicts a mesh network of drones to provide coordination and line of sight of multiple drones.

Referring now to FIG. 6, FIG. 6 depicts a mesh network of aerial views of the drones wherein a first drone is configured to have line of sight to a second drone and a second drone is in turn configured to have line of sight to a third drone and so forth. In these instances, a network of drones may be enabled so as to comply with a rule of line of sight between one or more parties.

Figure 7:
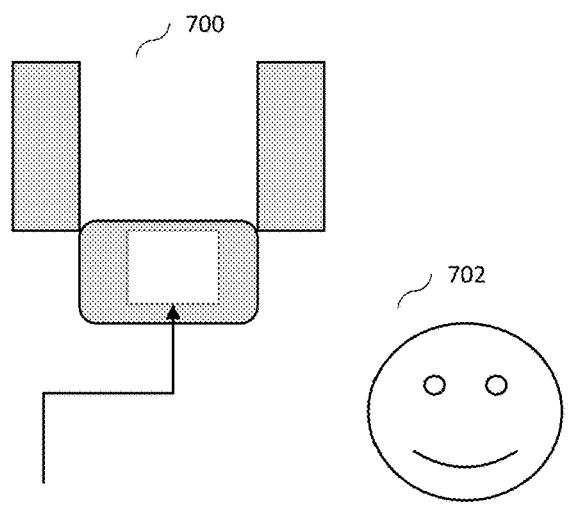
FIG. 7 depicts various authentication mechanism for a drone and a delivery receptacle.
Figure 8:
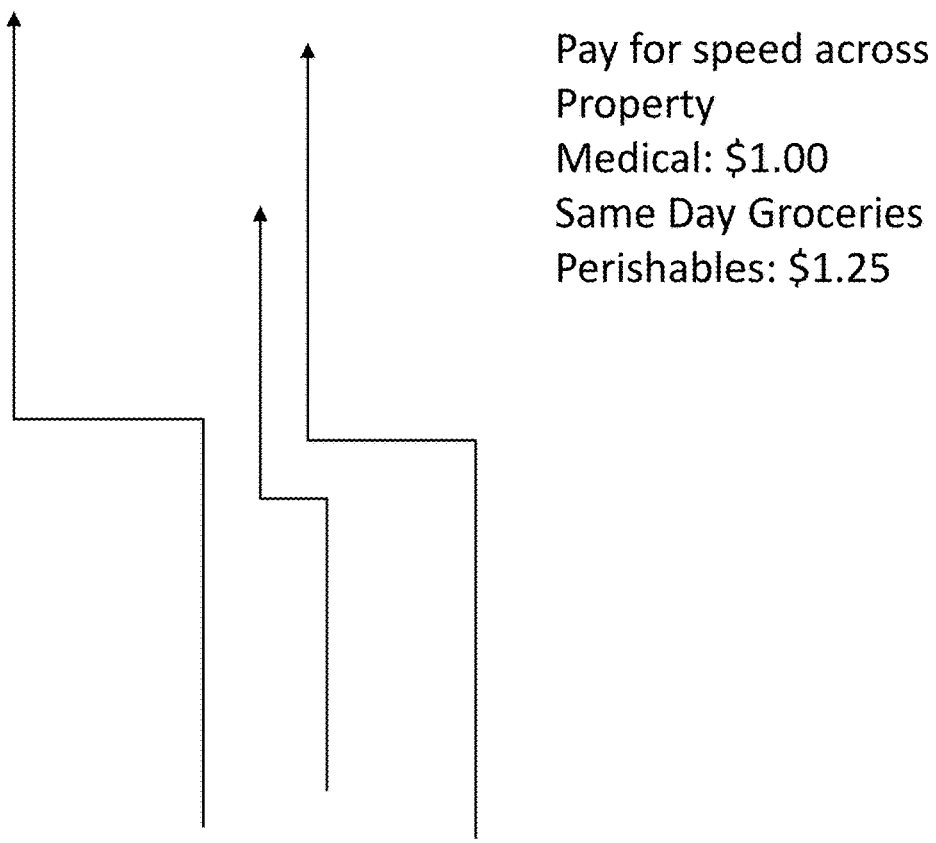
FIG. 8 depicts a pricing module for a drone operator to pay for increased or decreased quality of service.

Referring now to FIG. 7, FIG. 7 depicts a delivery agent network in which one or more drones may be enabled dynamically and in real time to add packages across a route. In these instances, packages may have a priority associated with them. For example, in the center compartment of the drone depicted a chamber may be enabled to place secure medicines, samples, blood, tests, and other medical use equipment. This chamber may further be enabled with a multi-setup authentication system comprising of both location of the drone, proximity to an individual, facial recognition, password, or combination of a multiple authentication methods. In addition, the authentication may occur to a receptacle or trashcan on the premise of a delivery zone and the password biometric or other confirmation match may occur on the receptacle. The drone and the receptacle in turn may have their own authentication mechanism so as to provide effective delivery.

As part of the delivery system, a requirement may be placed by the individual property owner and by the drone regarding the types of packages that are transmitted by the drone. A marketplace or independent auditing module may audit the delivery information of the package to determine any hazardous materials or otherwise less desirable materials that are transmitted. A property owner may then set the desirable information and place an restrictions on the types of products shipped over their property.

Various receptacles may also be rented out in a marketplace. These delivery lockers may be configured with on or more authentication schemes and be paired to a drone or a plurality of drones or a drone delivery network. These receptacles in turn may be enabled with specific one-time password or authentication mechanism for the individual.

In various embodiments of the platform, a server, drone, mobile device, wearable device or other computing device is enabled to be networked into a delivery and authentication system. A plurality of servers or other cloud instances may be enabled. Various embodiments may include:

A server module enabled to accept a geofence or a latitude and longitude and an aerial zone including altitude that is acceptable on a property. Various price levels may be set at a plurality of altitudes and at different times of the day.

A marketplace or other coordination system may be in place to allow a user or property owner to set a price or a price range and for delivery users to bid on the ask price as set by the user. A set of routes may be bid upon in conjunction so as to allow a delivery drone to get from a first point to a further point without having to rebid on the intermediate positions.

The marketplace server is enabled to service multiple bids along with a mapping module so as to determine a plurality of routes between a first point and a destination and the various routes that are most cost effective, reliable, efficient, or crowded.

A self-reporting drone altitude and flightplan may be submitted to a crowdsourced database or other server reporting service. This flight path system may include the time of day direction speed velocity and other details of how a drone or set of drones are operating. A user or plurality of users may establish accounts with the system. Data may be automatically reported from the drone to the crowdsourced flight-plan database.

A drone operator is enabled to see a visual map like interface and choose a path for the drone to travel towards its final destination. The operator may then set various altitudes or receive suggested altitudes based on weather, terrain or other indications. Further, home owners, business owners and other property owners may indicate their willingness to have drones fly over their property at lower altitudes. If users opt-in to have drones fly over their property, then the crowd sourced database may be enabled to then direct or provide a recommended or suggested route to the user that involves more of the users.

A slotting and recommendation system is further enabled to allow the users the ability to slot in their flightpaths at a different time period. The slotting module implemented at a server may randomly or purposely assign drones to hover at various altitudes across one or more landing or staging locations.

Figure 9:
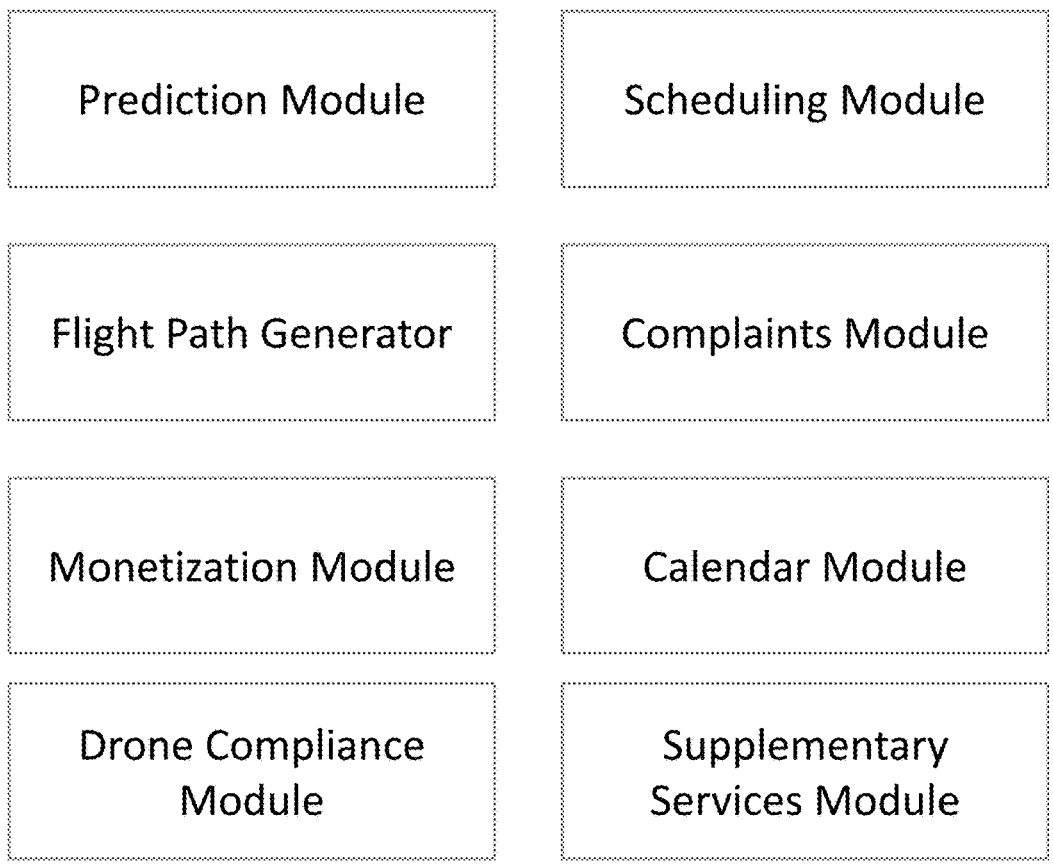
FIG. 9 depicts various functionality modules implemented and for use on a server or cloud device.
Figure 9:
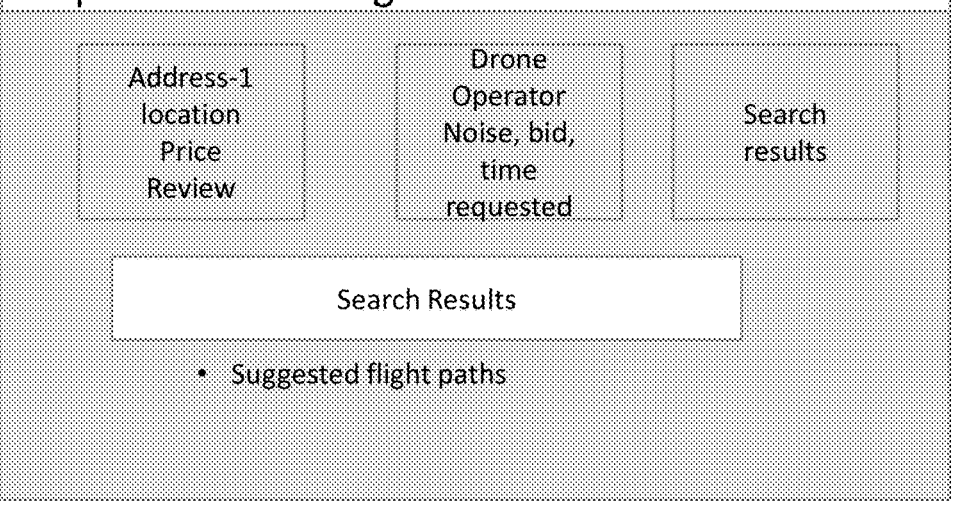

Referring now to FIG. 9, FIG. 9 depicts various modules that may be implemented in software code or instructions for execution by one or more processors on a cloud server or other device.

A recommendation system may further be enabled that allows users to set prices based on time of day, type of delivery, noise of drone, and other factors based in part on those of other neighbors and the types of delivery.

A matching module that enables property owners to be paired with drone delivery operators. The system may provide a chat board or related mechanism to allow the individuals to negotiate prices for the transfer of goods and the aerial paths of the drones.

A rating and review system may be implemented both on the drone operators and also on the property owners. That is the wind, terrain, obstacles and other properties may be enabled. A mobile phone personal drone or other device may be used to assess barometer, altitude and other environmental factors. A drone that passes over a property owners place may further be enabled to record and send back service information related to the property to a central server.

It is an aspect of the present disclosure to enable a reservation system such that a server can accept, track, book, and allow reservations of the aerial space including flight paths for a plurality of households. These reservations may be dynamic or may be booked in advance and include criteria such as noise, altitude, wind and other factors. A calendar system may further be included to manage the reservations. Reservations may be searched and placed in memory or a database of the server.

Various predictive analytics may be enabled on the platform to enable a recommendation system. The predictive analytics may be used so that the likelihood of a property being available or not being objected to by a user is shown.

In various instances, certain properties may be abandoned, unused or be public use. In those instances, a prediction module may be enabled to suggest lower cost paths or likely paths that are unlikely to generate complaints.

Each household or property position may be scored with a likelihood of generating complaints. The complaints module may be a function of the number of drones, the type of complex (such as apartment or home or office or home), prediction of time of day for the usage of the platform (such as office during working hours versus non working hours), and so forth. These prediction mechanisms may be enabled so as to allow the flight booking module to suggest one location over another location based on a criteria of minimizing complaints from property owners. Another criteria for the flight path may be minimizing the cost associated with a flight path. In these instances, a computation module on a server may look at all available paths and find public use, open park, commercial streets, or other paths for the drone to follow.

A traffic module may assess how likely and busy certain aerial zones above a property or a street is. In these instances a drone may access a non-public travel path by using the server platform to make a reservation with a set of home owners or each home owner individually to cut through their property. In these embodiments, virtual aerial streets may be created.

A drone compliance module may receive data from sensors on the rental property, a mobile device on the property, or the drone itself on how the drone performed when it was on the property. A compliance score may be created such that the deviation from the flight statistics and path including altitude, noise, speed, direction, velocity and so forth is calculated. A score that is significantly different over time from what the drone agrees it will do can result in a lower compliance score. A customer that is very noise sensitive may then be routed with traffic of drones that is in a closer range to their overall compliance from earlier. A drone that has a high variance score between their intended flight paths and their actual flight paths may be routed across customer properties that are less sensitive or likely to complain. A measure of the complaint rate from a user may be via a complaint form, the number of interactions they have with a customer service representative, or a sensitivity indicator on their profile that they set up with the reservation system.

Each property owner may further define various supplementary services that they can offer to drones or other delivery people that may interact with their property. As an example, a business owner may list a locker on their premise with a dynamic lock and key system. They may charge for this locker. Further, the business owner may list a charging port such that drones may dock and charge on the receptacle. A rate for the charging port may be assigned based on time, power consumption, type of drone or other factor.

In order to create a flight path, the system may not have all the availability information of various property owners at the current time. In these instances, the platform may suggest one tentative flight path to a drone operator network while it confirms availability with the property owners. Additionally, a temporary path may be created that can then be subsequently optimized contingent upon availability being confirmed from the property owners. As an example, as in FIG. 2, an indirect route is initially taken but a property 3 may be added to the platform subsequently based on providing a bonus or additional payment to the property 3 vendor.

It is intended that this disclosure may include other alternatives and variations. In various instances, the word drone is used. However, other aerial vehicles or devices including unmanned aerial vehicles and other devices are intended to be covered herein. It should be understood that though a drone or unmanned aerial vehicle is used in this context, a manned aerial vehicle may also be relevant. As devices such as hybrid cars/planes, personal aerial devices, and small aircraft proliferate, manned devices may also have an interplay between UAVs and AVs.

In various instances, multiple drones and reporting devices may be created to provide a terrain map of a property and to aggregate listing data from multiple drones into one overall aerial map of an individual's property.

A network of drone and terrestrial delivery points may be created and displayed on a map. A user may request a drone to deliver a package to a specific point on a map. The reservation system may further enable the user to book a delivery place or a locker and be given a temporary drone address that includes a street address, longitude/latitude, altitude, or other identifying information along with a delivery code or authentication method such as serial number of drone, public key/private key, password, or other factor. The platform may also allow the delivery locker or receptacle also to be booked. These unique addresses may be generated by the reservation platform and provided both to the property owner and to the drone operator.

In various embodiments, a user may be enabled to identify objects such as a tree as a parking spot for drones. A rooftop may further be identified as a parking or landing area. A charging port may be provided on the external part of a house or a solar panel may be linked with a drone charging port to provide for a solar to drone charging on the go. These supplementary services may be rented out by the user by identifying the supplementary services and placing them in the location profile for the property. Drone operators may then bid on these areas and reserve them for time periods. An availability and reservation module implemented at the server may take reservations for the time periods of these places.

As an example, a rooftop of an office park may be enabled to a landing zone, waiting zone, and charging zone for a plurality of drones after hours. The office park property manager may identify the rooftop broadly or identify microspots on the rooftop for reservation by the drones. These spots may be assigned a unique identifier by the user or the owner. The platform and reservation and monetization platform allows for reservations of these micro-entities on a property. That is a reservation can be made a landing zone between a altitude of ground and up to a certain height say 1000 ft. The reservation platform may the be configured with a slotting mechanism so as to allow drones to be slotted into various horizontal and vertical areas such that multiple drones may be placed into a hovering setup.

The platform described herein may further integrate with various mapping software systems. The platform may be enabled with a reservation interface, transaction interface, and financial banking interfaces. Users may be able to associate their bank account so as to receive payment from rentals of their airspace. Drone operators may be enabled to provide credit card details so as to pay for the services contained herein.

The foregoing description of specific embodiments of the present disclosure have been presented for purposes of illustration and description. They are not intended to be exhaustive or to limit the disclosure to the precise forms disclosed, and it should be understood that many modifications and variations are possible in light of the above teaching. The embodiments were chosen and described in order to best explain the principles of the present disclosure, and its practical application, to thereby enable others skilled in the art to best utilize the present disclosure and various embodiments, with various modifications, as are suited to the particular use contemplated. It is intended that the scope of the disclosure be defined by the Claims appended hereto and their equivalents.

What is claimed is:

1. A system to deliver a plurality of packages including a first package and a second package comprising:
    (a) a mobile application stored in a non-transitory computer readable medium configured to accept at least one location for a geo-fenced area on a property to accept delivery of at least one of the plurality of packages;
    (b) at least one server, configured to accept from the mobile application the at least one location for the geo-fenced area and store the at least one location in at least one accessible memory associated with a profile;
    (c) a first drone coupled to the first package and a second drone coupled to the second package;
    (d) a large drone which is of greater size than the first drone and the second drone, and further wherein the first drone and the second drone are enabled to fit inside the large drone;
    (e) a module executed by at least one processor of the at least one server enabled to set the delivery of the large drone, the first drone and the second drone including:
    directing the large drone to travel to a specified location;
    instructing the large drone to allow for the release of the first drone and the second drone upon reaching the specified location; and
    directing the first drone to deliver the first package to a first location and directing the second drone to deliver the second package to a second location.

2. The system of claim 1, wherein the at least one location is configured further with a physical locker to store at least one of the plurality of packages, wherein said locker is enabled with a one-time password for a user to access at least one of the plurality of packages; and wherein subsequent to authentication to the locker, the locker provides access to the user to collect at least one of the plurality of packages.

3. The system of claim 2, wherein a multi-setup authentication system comprising of a location of the user, a proximity of the user to the locker, a facial recognition of the user, and a one-time password authorizes the user to gain access to at least one of the plurality of packages.

4. The system of claim 1, wherein an identifying information comprising of a delivery code and/or a serial number of at least one drone is provided to the user.

5. The system of claim 4, wherein a center compartment of the locker is enabled to place secure medication deliveries for the user.

6. The system of claim 2, wherein the at least one server is enabled to accept a geofence area for an acceptable package delivery on the property and link said geofenced area with the locker.

7. The system of claim 2, wherein the locker is configured to be paired with the first drone such that the first drone is enabled to recharge at the locker.

8. The system of claim 1, wherein the at least one server is enabled to add one or more drones dynamically to a delivery network to add pickup and delivery of the plurality of packages across a route by the one or more drones.

9. The system of claim 1, wherein a user is enabled via the mobile application to annotate a property profile including terrain and/or obstacles.

10. The system of claim 9, wherein the at least one server is enabled to accept a plurality of delivery locations at a plurality of point of interests on the property.

11. The system of claim 10, wherein the at least one server is enabled to accept an upload of a plurality of images from the application and are recognized by the at least one server and further analyzed by the at least one server to identify objects on the property.

12. The system of claim 9, wherein a plurality of drones are enabled to self-coordinate to deliver the plurality of packages.

13. The system of claim 9, wherein the user is enabled via the application to identify a charging port on an external part of a building or a solar panel, wherein said charging port is enabled to provide charging to at least one drone.

14. The system of claim 1, wherein a user is enabled via the mobile application to set a drop off point to allow the first drone to deliver the first package to one or more vehicles.

\* \* \* \* \*